US012182634B2

(12) United States Patent
Ghosh

(10) Patent No.: US 12,182,634 B2
(45) Date of Patent: Dec. 31, 2024

(54) DEVICE ACCESS CONTROL FOR APPLICATIONS OF MULTIPLE CONTAINERS

(71) Applicant: Juniper Networks, Inc., Sunnyvale, CA (US)

(72) Inventor: Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 305 days.

(21) Appl. No.: 16/983,500

(22) Filed: Aug. 3, 2020

(65) Prior Publication Data

US 2022/0035685 A1 Feb. 3, 2022

(51) Int. Cl.
| | |
|---|---|
| G06F 9/52 | (2006.01) |
| G06F 9/54 | (2006.01) |
| G06F 11/30 | (2006.01) |
| G06F 11/34 | (2006.01) |

(52) U.S. Cl.
CPC ............ G06F 9/52 (2013.01); G06F 9/542 (2013.01); G06F 11/302 (2013.01); G06F 11/3495 (2013.01)

(58) Field of Classification Search
CPC .......... G06F 9/52; G06F 9/542; G06F 11/302; G06F 11/3495
See application file for complete search history.

(56) References Cited

U.S. PATENT DOCUMENTS

| | | | |
|---|---|---|---|
| 2006/0271542 A1 | 11/2006 | Harris et al. | |
| 2012/0047425 A1* | 2/2012 | Ahmed | G06F 40/174 715/234 |
| 2014/0068127 A1* | 3/2014 | Baron | G06F 9/526 710/200 |
| 2015/0160986 A1 | 6/2015 | Ni et al. | |
| 2017/0228182 A1* | 8/2017 | Novak | G06F 3/067 |
| 2018/0191782 A1* | 7/2018 | Djordjevic | H04L 67/289 |
| 2018/0260429 A1* | 9/2018 | Bhargava | G06F 16/2343 |

(Continued)

FOREIGN PATENT DOCUMENTS

CN 106874125 A 6/2017

OTHER PUBLICATIONS

Extended European Search Report for Application No. EP20197584.4, mailed on Mar. 16, 2021, 39 pages.

*Primary Examiner* — Kevin L Young
*Assistant Examiner* — Carina Yun
(74) *Attorney, Agent, or Firm* — Harrity & Harrity, LLP

(57) ABSTRACT

A device may receive a lock request associated with using an embedded device of a containerized environment from a first instance of an application being executed in a first container of the containerized environment. The device may perform a lock operation associated with the embedded device to permit the first instance of the application to use the embedded device and to prevent a second instance of the application, executing in a second container of the containerized environment, from using the embedded device. The device may monitor use of the embedded device during an access operation of the first instance of the application to detect an unlock event associated with unlocking the embedded device. The device may perform an unlock operation based on detecting the unlock event to permit the second instance of the application to use the embedded device.

20 Claims, 7 Drawing Sheets

(56) References Cited

U.S. PATENT DOCUMENTS

| | | | |
|---|---|---|---|
| 2020/0082071 A1* | 3/2020 | Cherny | G06F 21/45 |
| 2020/0104385 A1 | 4/2020 | Zheng et al. | |
| 2020/0356406 A1* | 11/2020 | Mohan | G06F 9/5077 |
| 2020/0364095 A1* | 11/2020 | Luo | H04L 67/1097 |
| 2021/0243180 A1* | 8/2021 | Beale | H04L 9/3236 |
| 2022/0240213 A1* | 7/2022 | Ly | H04W 60/04 |
| 2023/0148302 A1* | 5/2023 | Ping | H04W 16/10 370/254 |

* cited by examiner

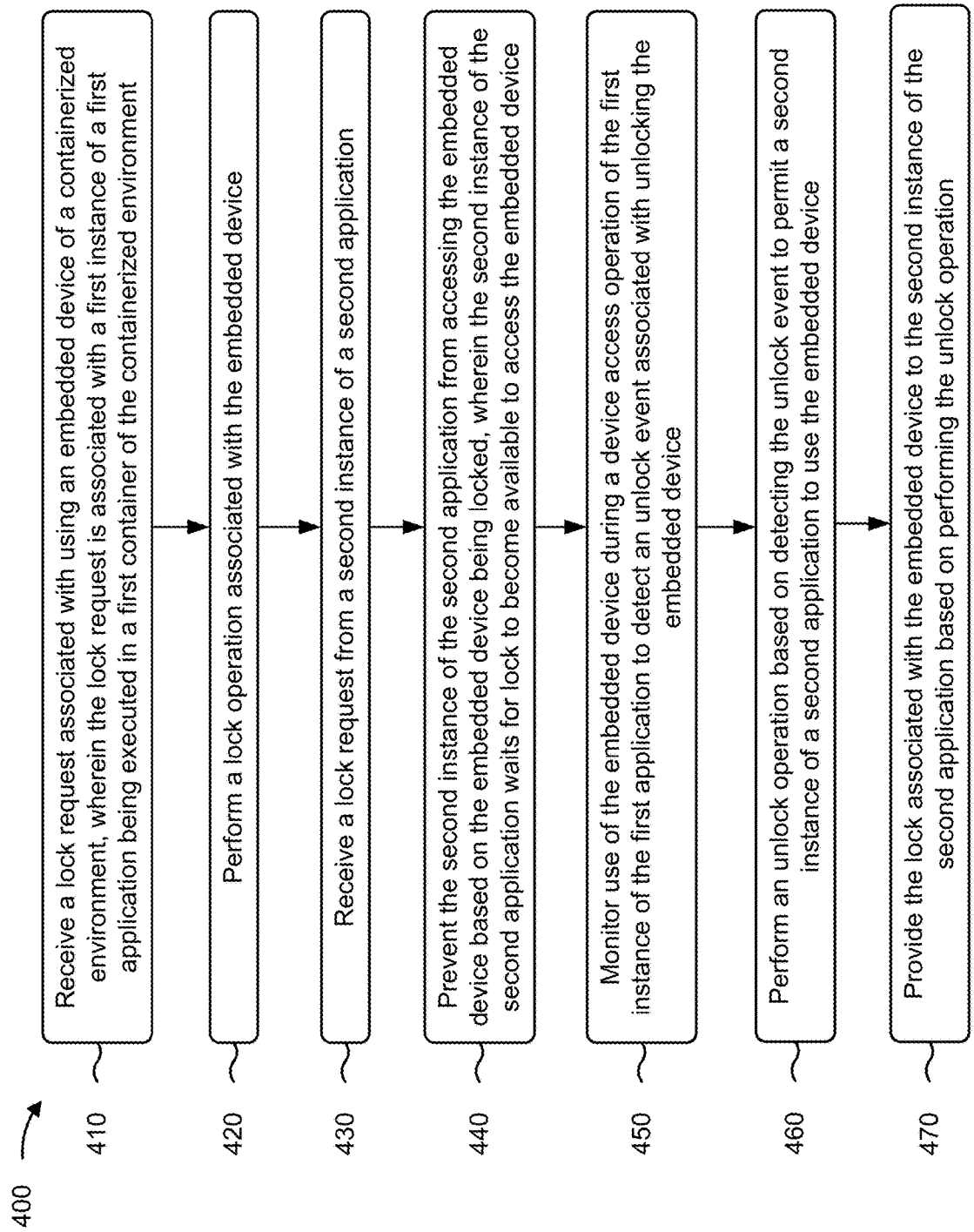

DEVICE ACCESS CONTROL FOR APPLICATIONS OF MULTIPLE CONTAINERS

BACKGROUND

Containerization is a form of virtualization, through which applications are run in isolated user spaces called containers, all using the same shared operating system. A container simulates a separate instance of an application from other containers. The container includes the application together with all of the application's related configuration files, libraries, and dependencies required for the application to run in a computing environment.

SUMMARY

In some implementations, a method includes receiving, by a device, a lock request associated with using an embedded device of a containerized environment, wherein the lock request is associated with a first instance of a first application being executed in a first container of the containerized environment; performing, by the device, a lock operation associated with the embedded device to: permit the first instance of the first application to use the embedded device, and prevent a second instance of a second application from using the embedded device, wherein the second instance of the second application is executing in a second container of the containerized environment; monitoring, by the device, use of the embedded device during a device access operation of the first instance of the first application to detect an unlock event associated with unlocking the embedded device; and performing, by the device, an unlock operation based on detecting the unlock event to permit the second instance of the second application to use the embedded device.

In some implementations, a device includes one or more memories and one or more processors to: receive, from a first container of a containerized environment, a lock request associated with using an embedded device of a containerized environment, wherein the lock request is received from a first instance of a first software development kit (SDK) being used by a first application in the first container; perform a lock operation associated with the embedded device to: permit the first instance of the first SDK to use the embedded device in association with a device access operation, and deny a lock request, received during the device access operation, from a second instance of a second SDK in a second container to prevent the second instance of the second SDK from using the embedded device during the device access operation; monitor the device access operation to detect an unlock event associated with unlocking the embedded device; and perform an unlock operation based on detecting the unlock event to permit the second instance of the second SDK to use the embedded device.

In some implementations, a non-transitory computer-readable medium storing a set of instructions includes one or more instructions that, when executed by one or more processors of a device, cause the device to: receive a lock request associated with using a set of embedded devices of a containerized environment, wherein the lock request is associated with a first instance of an SDK that is associated with a device type of the set of embedded devices and that is in a first container of the containerized environment; identify an embedded device, of the set of embedded devices, for use in association with a device access operation, wherein the embedded device is identified based on the device type being identified in the lock request; perform a lock operation associated with the embedded device to: permit the first instance of the SDK to perform the device access operation on the embedded device, and prevent a second instance of the SDK from accessing the embedded device during the device access operation, wherein the second instance of the SDK is executing in a second container of the containerized environment; detect an unlock event associated with unlocking the embedded device; and perform, based on detecting the unlock event, an unlock operation to permit the second instance of the SDK to use the embedded device.

BRIEF DESCRIPTION OF THE DRAWINGS

FIG. 4 is a flow chart of example processes relating to device access control for applications of multiple containers.

DETAILED DESCRIPTION

Figure 1A:
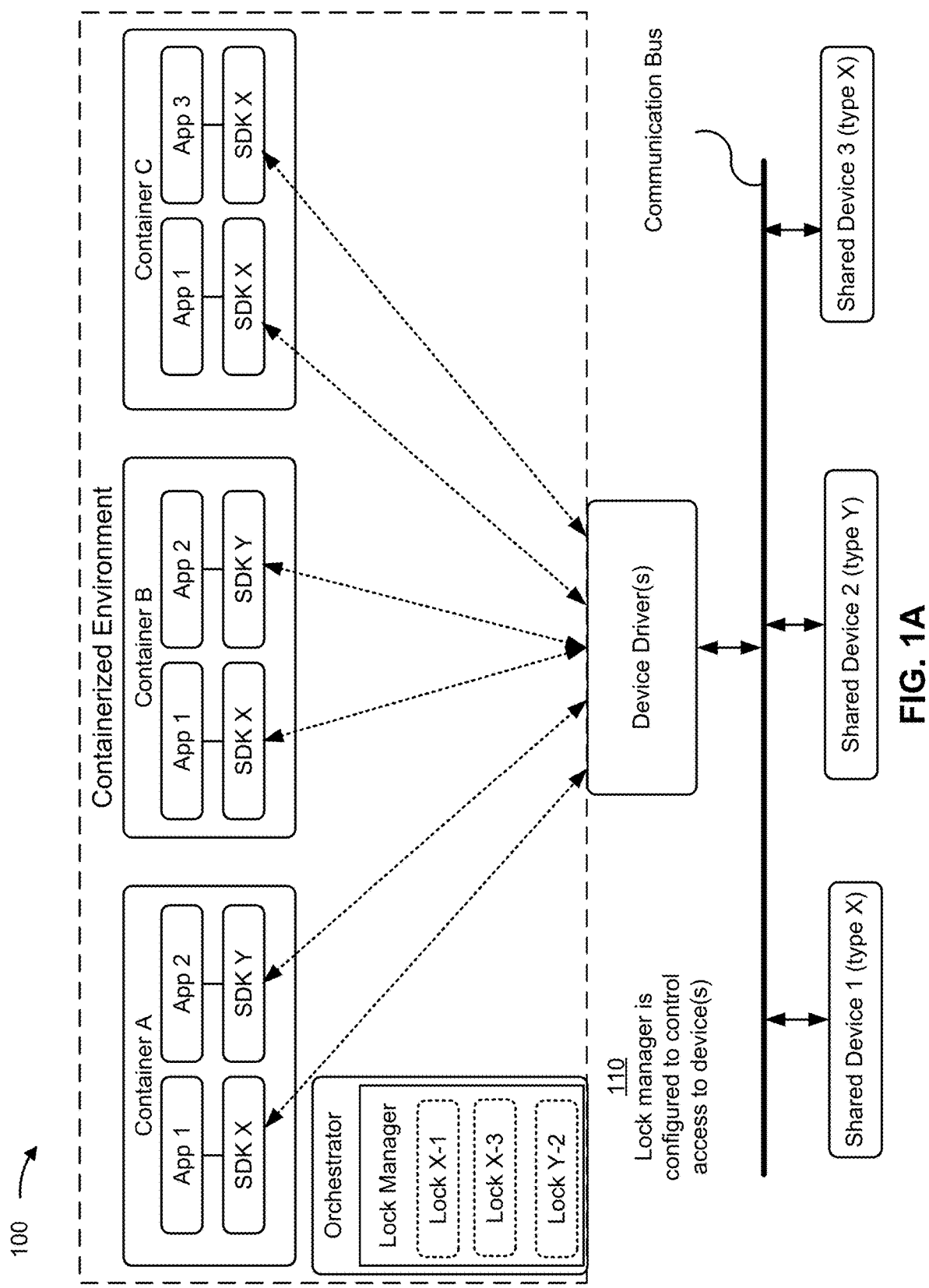
FIGS. 1A-1D are diagrams of one or more example implementations described herein.

The following detailed description of example implementations refers to the accompanying drawings. The same reference numbers in different drawings may identify the same or similar elements.

A computing device may include a set of standard hardware components, such as a processor, a memory, a communication bus, and/or the like. An embedded device may be a computing device that includes one or more non-standard hardware components (e.g., a packet forwarding engine, a switch fabric, a retimer, a sensor, and/or the like) in addition to the set of standard hardware components. Applications running on an embedded device may access and/or program a non-standard hardware component to perform a specialized function associated with the embedded device. For example, an application running on a router may access and/or program a packet forwarding engine to enable the router to route traffic through a network.

In some cases, the embedded device may include instances of an application executing in a group of containers. Each instance of the application may access a shared component of the embedded device to perform a function associated with the embedded device. For example, the embedded device may include a physical line card that is sliced to cause the physical line card to behave like multiple logical line cards. Each slice of the physical line card may be allocated to a respective routing engine slice and, together, may function as an independent router. Each slice of the physical line card may be associated with a respective container that may access various line card hardware components. In some cases, two of the containers may concurrently access the line card hardware component. The concurrent access of the line card hardware component may result in an occurrence of an error, a termination of a process being performed by a container, and/or the like.

Some implementations described herein relate to a lock manager that controls access to a shared resource of an embedded device. The lock manager may receive a lock request associated with using a shared device. The lock request may be associated with a first instance of an application being executed in a first container of a containerized environment associated with the lock manager. The lock manager may perform a lock operation associated with the shared device based on receiving the lock request. The lock operation may permit the first instance of the application to use the embedded device and may prevent a second instance of the application, executing in a second container, from using the embedded device. The lock manager may monitor use of the shared device during a device access operation of the first instance of the application to detect an unlock event associated with unlocking the shared device. The lock manager may perform an unlock operation based on detecting the unlock event to unlock the shared device and to permit the second instance of the application to use the shared device.

In this way, the lock manager may prevent the concurrent access of the shared device by multiple instances of an application, by instances of different applications, and/or the like. By preventing the concurrent access of the shared device, the lock manager may prevent an operation associated with a first instance of an application from being overwritten, modified, and/or the like by an operation associated with a second instance of the application, thereby conserving computing resources (e.g., processor resources, memory resources, communication resources, and/or the like) that otherwise would have been utilized to re-perform the operation associated with the first instance of the application and/or the operation associated with the second instance of the application.

For example, concurrent access of the shared device may result in incorrect programming of the device and, as a result, the shared device may not be able to perform a desired function. Further, the consequence of such incorrect programming of the shared device may be significant. For example, the incorrect programming of the shared device may result in a packet being dropped, incorrect routing of a packet, link failure, and/or the like. Recovery from the consequence of incorrect programming of the shared device may be complex. For example, recovery may require re-initialization of the shared device, a re-booting of a system associated with the shared device, and/or the like, thereby resulting in the waste of computing resources utilized to recover from the consequence of incorrect programming of the shared device.

FIGS. 1A-1D are diagrams of one or more example implementations 100 described herein. As shown in FIGS. 1A-1D, an embedded device includes a containerized environment, a device driver module, and a group of shared devices (Shared Device 1, Shared Device 2, and Shared Device 3, as shown in FIG. 1A) connected to the device driver module via a communication bus. The containerized environment may include a plurality of containers (e.g., Container A, Container B, and Container C, as shown in FIGS. 1A-1D) and an orchestrator.

In some implementations, a container, of the plurality of containers, may include an application configured to utilize a software development kit (SDK) to access a shared device, of the group of shared devices, via the device driver module. In some implementations, the application may access the shared device using an operating system interface, an application programming interface (API), and/or the like.

In some implementations, the orchestrator may include a lock manager that is configured to control access to the group of shared devices. The lock manager may utilize a locking mechanism to prevent two or more applications from concurrently accessing a shared device. In some implementations, the lock manager is included in the embedded device. For example, as shown in FIG. 1A, the lock manager is included in an orchestrator associated with the containerized environment. In some implementations, the lock manager is included in another device. For example, the lock manager may be included in a device included in a cloud computing environment that provides the locking mechanism as a service.

As shown in FIG. 1A, and by reference number 110, the lock manager is configured to control access to the group of devices associated with the containerized environment. In some implementations, the lock manager is configured to control access to the group of devices based on access information associated with the group of devices. The access information may include information identifying a shared device for which access is to be controlled (e.g., a device identifier), information identifying a quantity of locks to be utilized by the lock manager (e.g., one lock for each shared device, one lock for a set of shared devices of the group of shared devices, and/or the like), information identifying a type of a lock (e.g., semaphore, mutex, and/or the like) to be utilized by the lock manager, information identifying a type of shared device for which access is to be controlled (e.g., packet forwarding engine, sensor, fabric, and/or the like), and/or the like.

In some implementations, the lock manager may determine the access information based on a characteristic associated with the embedded device. For example, the lock manager may determine the access information based on determining that a shared device is to be concurrently accessed, based on a type of shared device included in the embedded device (e.g., a packet forwarding engine, a switch fabric, a retimer, and/or the like), based on a type of the embedded device (e.g., a router, a switch, and/or the like), based on a function performed by a shared device (e.g., a routing function, a switching function, and/or the like), and/or the like. Alternatively, and/or additionally, the lock manager may determine the access information based on a user input. For example, a user may utilize a user interface associated with the lock manager to input the access information.

The lock manager may allocate one or more locks for the group of shared devices based on the access information. For example, the access information may indicate that a respective lock is to be utilized for each shared device, of the group of shared devices. The lock manager may allocate a respective lock for each shared device based on the access information indicating that the respective lock is to be utilized for each shared device.

The lock manager may provide information identifying the allocated locks to the applications based on allocating the locks. The lock manager may determine that an application is configured to access a shared device, of the group of shared devices. The lock manager may identify a lock allocated to the shared device and may provide information associated with the lock to the application. In some implementations, the lock manager provides the information associated with the lock during creation of a container associated with the application.

The information associated with the lock may include information associated with obtaining the lock from the lock manager (e.g., information identifying a command and/or a request to be transmitted to the lock manager to obtain the lock and/or lock a shared device), information associated with returning the lock to the lock manager (e.g., information identifying a command and/or a request to be transmitted to the lock manager to return the lock and/or unlock a shared device), and/or the like. The application may receive the information associated with the lock and may provide the information to an SDK associated with the application.

In some implementations, the application provides the information to the SDK by assigning the lock to a lock vector associated with the SDK.

Figure 1B:
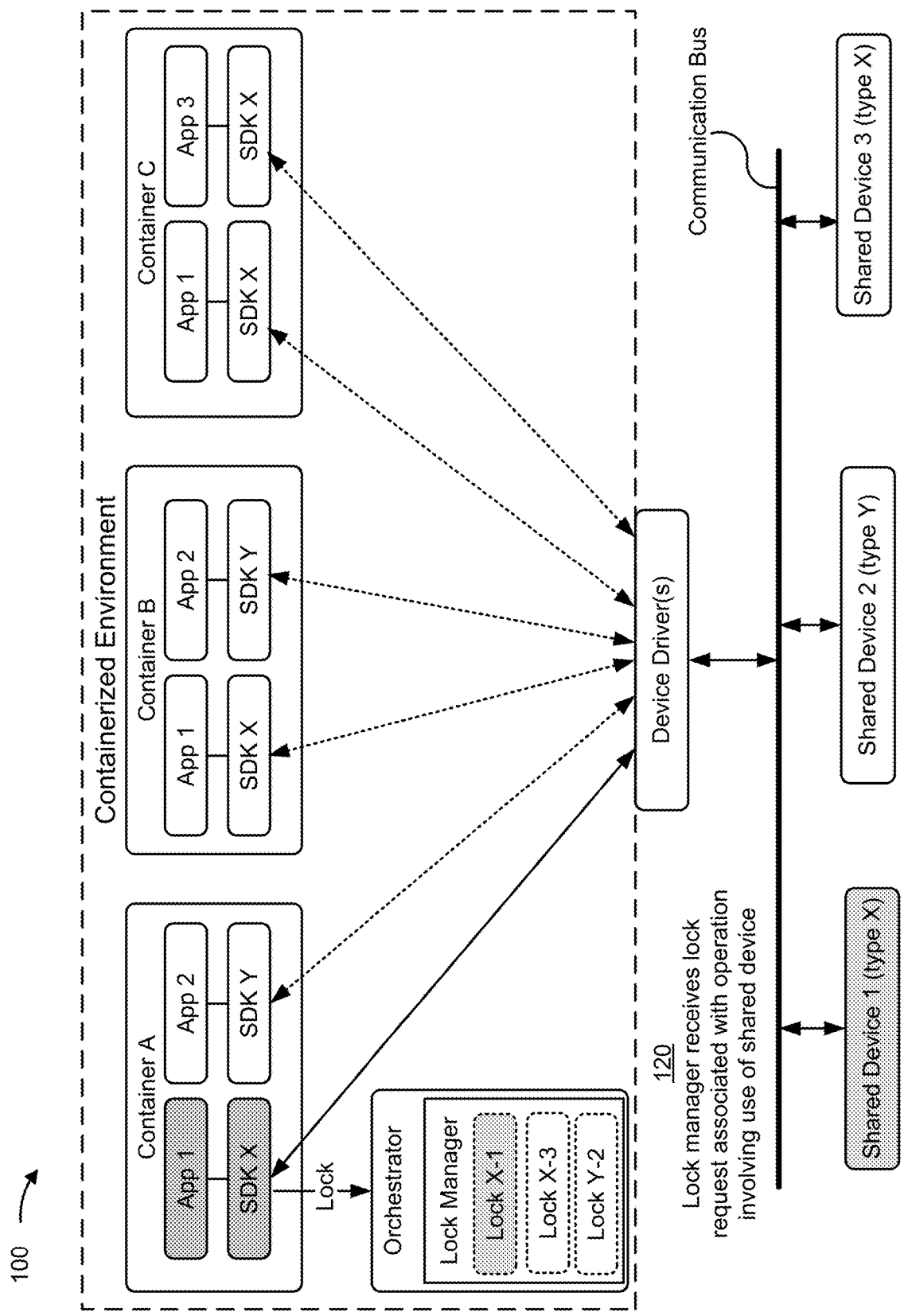

As shown in FIG. 1B, and by reference number 120, the lock manager receives a lock request associated with an operation involving use of a shared device. The lock request may be associated with an instance of an application (e.g., App 1, as shown in FIG. 1B) being executed in a first container (e.g., Container A, as shown in FIG. 1B) of the containerized environment. The lock manager may receive the lock request based on the instance of the application initiating the operation involving use of the shared device. For example, the lock manager may receive the lock request based on the instance of the application initiating an access operation (e.g., a write operation, a read operation, and/or the like) associated with the shared device.

In some implementations, the lock manager receives the lock request from an SDK (e.g., SDK X, as shown in FIG. 1B) associated with the instance of the application. The instance of the application may determine to perform the access operation on the shared device. The instance of the application may cause the SDK associated with the instance of the application to provide a lock request to the lock manager to request the lock from the lock manager based on determining to perform the access operation. The lock request may include information identifying the shared device associated with the operation (e.g., an identifier associated with the shared device), information identifying a type of the shared device, information identifying a quantity of shared devices associated with the operation, information identifying the instance of the application, information identifying the SDK associated with the instance of the application, and/or the like.

The lock manager may receive the lock request and may determine a shared device, of the group of shared devices, associated with the lock request. For example, the lock request may include information identifying the identifier of the shared device. The lock manager may identify the shared device based on the identifier.

Figure 1C:
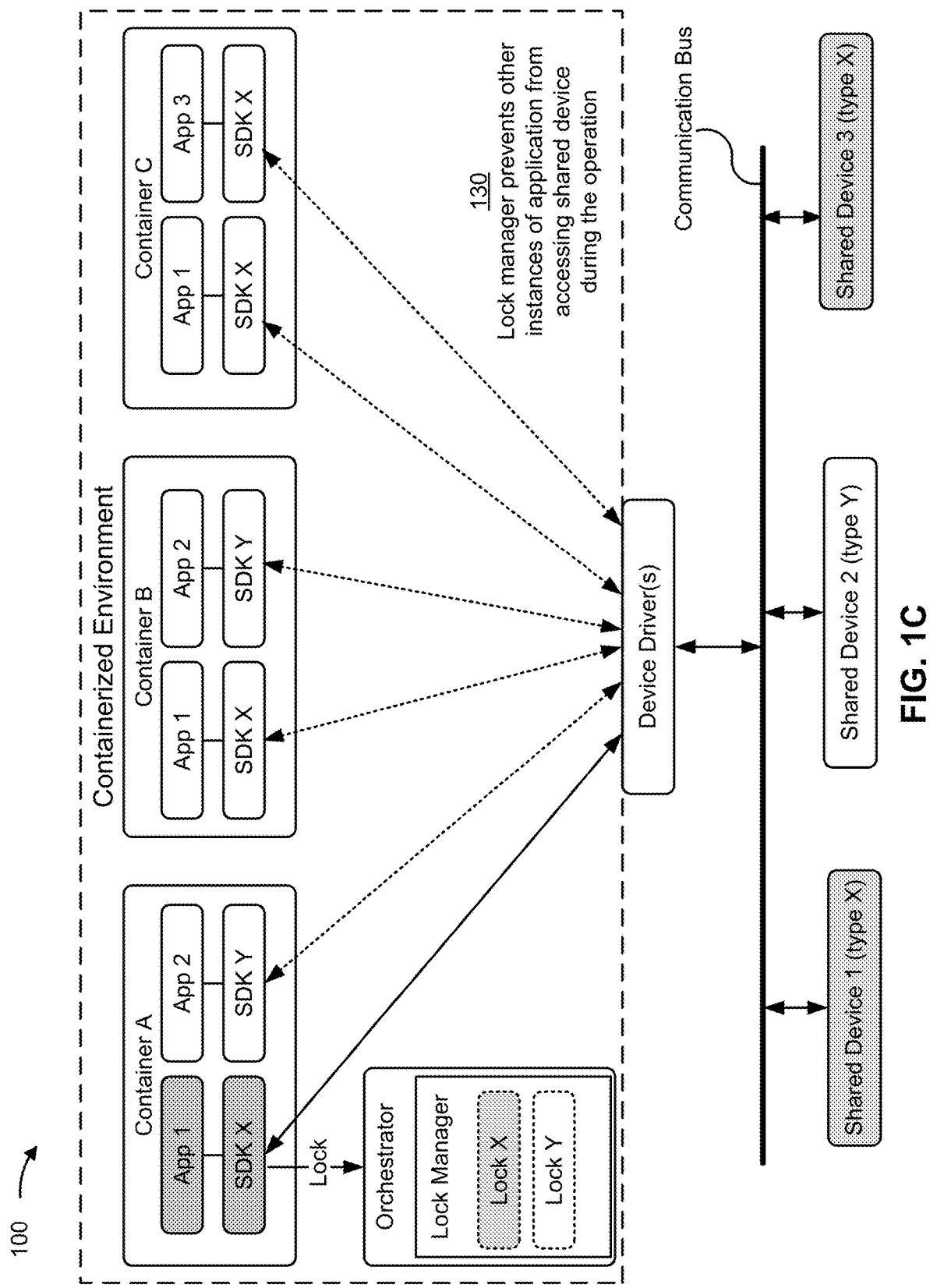

In some implementations, as shown in FIG. 1C, the shared device determined by the lock manager may include a set of shared devices. For example, the lock request may include information identifying a type of the shared device associated with the operation (e.g., type X). The lock manager may identify a set of shared devices (e.g., Shared Device 1 and Shared Device 3, as shown in FIG. 1C), of the group of shared devices, comprising the type of the shared device associated with the operation.

In some implementations, the lock manager may verify that the shared device is not locked according to another lock request received from a different instance of the application and/or a different SDK operating in a different container. The lock manager may verify that the shared device is not locked based on determining that the shared device is associated with an unlocked status. In some implementations, the lock manager may determine that the shared device is associated with the unlocked status based on information included in a data structure (e.g., a database, a table, a list, and/or the like) associated with the lock manager.

The lock manager may perform a lock operation associated with the shared device based on verifying that the shared device is unlocked. The lock operation may permit the instance of the application to utilize the shared device to perform the operation. The lock operation may prevent another instance of the application, executing in another container, from utilizing the shared device.

In some implementations, the lock operation includes providing the lock associated with the shared device to the instance of the application. For example, the lock manager may provide, to the instance of the application, information indicating that the lock request is approved, information indicating that the instance of the application is permitted to perform the operation, information identifying the shared device, information identifying a time period for which the shared device will be locked, and/or the like.

In some implementations, the lock operation includes updating a status of the shared device. For example, the lock manager may store, in the data structure, information indicating that the status of the shared device is locked, information identifying the instance of the application, information identifying the container associated with the instance of the application, information identifying the time period for which the shared device will be locked, information identifying a session identifier associated with the instance of the application and/or the operation, information identifying a quantity of times the shared device has been locked and/or unlocked during a period of time, information identifying a quantity of times an application was prevented from accessing the shared device based on the shared device being locked, and/or the like.

The instance of the application may perform the operation associated with the shared device based on the lock manager performing the lock operation. For example, the instance of the application may perform the operation based on receiving the lock from the lock manager, based on the status of the shared device being updated, and/or the like.

As shown in FIG. 1C, and by reference number 130, the lock manager prevents other instances of the application (and instances of other applications) from accessing the shared device (e.g., Shared Device 1, as shown in FIG. 1B, Shared Devices 1 and 3, as shown in FIG. 1C) during the operation. The lock manager may prevent another instance of the application from accessing the shared device during the operation by denying a lock request received from the other instance of the application. The other instance of the application may be executing in a different container (e.g., Container C, as shown in FIG. 1C) and may provide a lock request associated with the shared device to the lock manager. The lock manager may identify the shared device based on information included in the lock request. The lock manager may determine that the shared device is locked based on information included in the data structure indicating that the status of the shared device is locked. In some implementations, the lock manager may deny the lock request to prevent the other instance of the application from accessing the shared device based on the status of the shared device being locked.

In some implementations, the lock manager may cause the other instance of the application to wait to access the shared device. The lock manager may store information identifying the other instance of the application in a data structure. The data structure may store a list of applications waiting to access the shared device, a time at which the applications provided a lock request associated with accessing the shared device, an order in which the lock requests were received by the lock manager, and/or the like. Upon detecting an unlock event associated with the shared device and unlocking the shared device, as described below, the lock manager may utilize the information stored in the data structure to permit an application that is waiting to access the shared to device (e.g., the other instance of the application) to access the shared device.

In some implementations, multiple instances of one or more applications may be waiting to access the shared device. The lock manager may permit the multiple instances of the one or more applications to access the shared device based on a first come, first serve basis. For example, the lock manager may identify an instance of an application that was first to request the lock for the shared device relative to other instances of applications that requested the lock for the shared device based on the information stored in the data structure. The lock manager may provide the lock to the instance of the application based on the instance of the application being the first to request the lock for the shared device. The lock manager may subsequently provide the lock to the multiple instances of the one or more applications in a similar manner based on an order in which the multiple instances of the one or more applications requested the lock for the shared device.

Figure 1D:
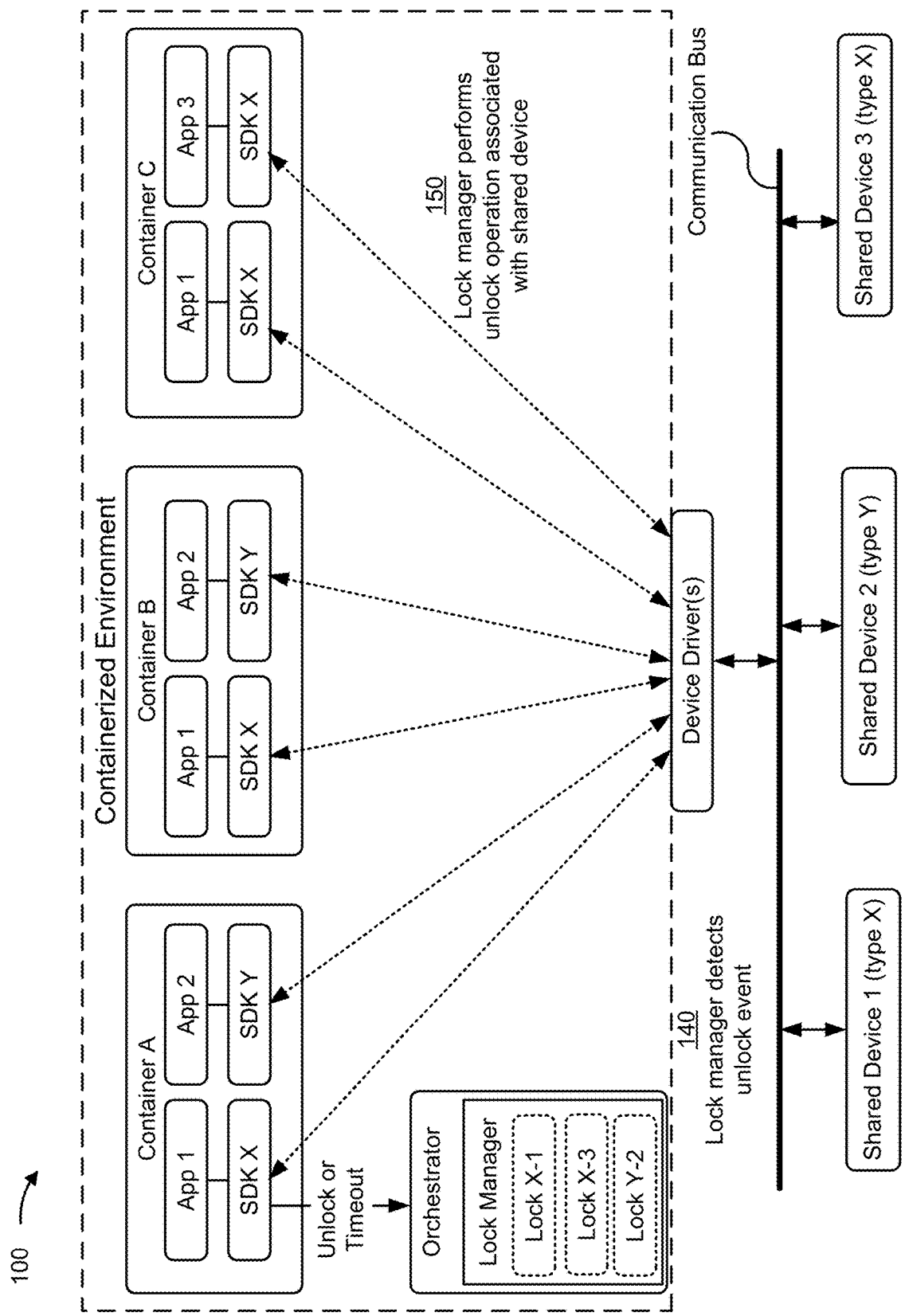

As shown in FIG. 1D, and by reference number 140, the lock manager detects an unlock event associated with the shared device. In some implementations, the lock manager detects the unlock event based on monitoring use of the shared device by the instance of the application. For example, the lock manager may determine the unlock event based on determining that the instance of the application is non-responsive, based on determining an occurrence of an error associated with the instance of the application and/or the operation, based on determining an expiration of a time period associated with the operation and/or the lock, and/or the like.

In some implementations, the lock manager detects the unlock event based on information received from the instance of the application and/or the SDK associated with the instance of the application. For example, the SDK associated with the instance of the application may provide an unlock request to the lock manager based on the instance of the application completing the operation.

In some implementations, the lock manage detects the lock event based on determining that the application has crashed, failed, stopped executing, and/or the like. For example, the instance of the application may acquire the lock and crash before releasing the lock. The lock manager may detect the crash of the application and unlock the shared device automatically.

As shown by reference number 150, the lock manager performs an unlock operation associated with the embedded device. The lock manager may perform the unlock operation based on detecting the unlock event and/or to permit the other instance of the application to access the shared device. In some implementations, the unlock operation may include updating a status of the shared device to indicate that the shared device is unlocked, providing information indicating that the shared device is unlocked to the instance of the application and/or to the other instance of the application, and/or the like.

In this way, the lock manager may control access to a shared device by instances of applications executing in a group of containers included in a containerized environment. By controlling access to the shared device, the lock manager may prevent concurrent access of the shared device by multiple instances of applications executing in different containers of a containerized environment.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices, additional applications inside containers, additional containers, fewer containers, applications associated with an SDK, applications not associated with an SDK, and/or the like than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
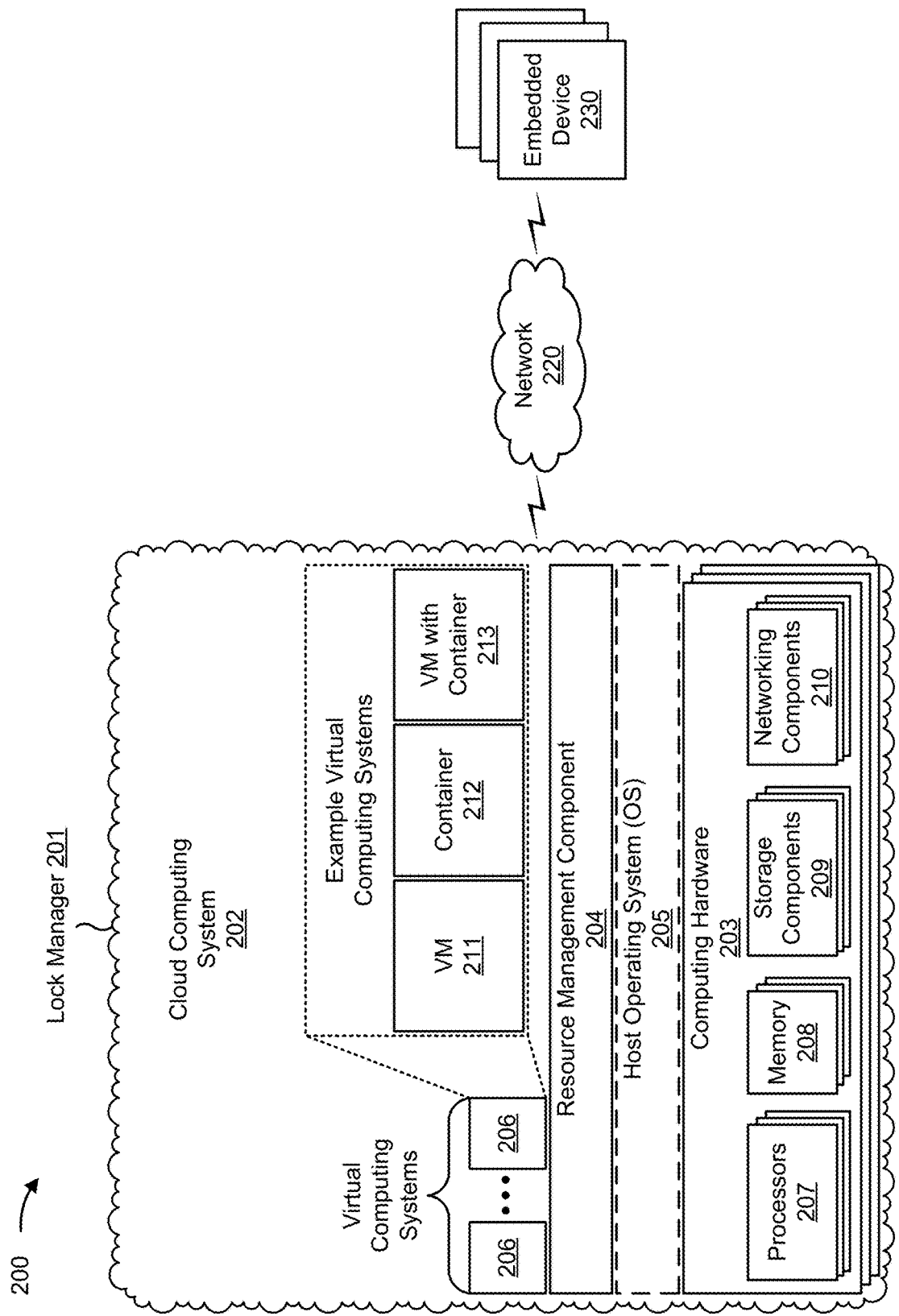
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a lock manager 201, which may include one or more elements of and/or may execute within a cloud computing system 202. The cloud computing system 202 may include one or more elements 203-213, as described in more detail below. As further shown in FIG. 2, environment 200 may include a network 220 and/or an embedded device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the lock manager 201 may include one or more elements 203-213 of the cloud computing system 202, may execute within the cloud computing system 202, and/or may be hosted within the cloud computing system 202, in some implementations, the lock manager 201 may not be cloud-based (e.g., may be implemented outside of a cloud computing system) or may be partially cloud-based. For example, the lock manager 201 may include one or more devices that are not part of the cloud computing system 202, such as device 300 of FIG. 3, which may include a stand-alone server or another type of computing device. The lock manager 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Embedded device 230 may include one or more devices capable of receiving, generating, storing, processing, and/or providing information associated with device access control for applications of multiple containers, as described herein. Embedded device 230 may include a special purpose computing device that includes one or more non-standard hardware components (e.g., a packet forwarding engine, a switch fabric, a retimer, a sensor, and/or the like) in addition to a set of standard hardware components (e.g., a process, a memory, a communication bus, and/or the like) included in a non-special purpose computing device. For example, embedded device 230 may include a router, such as a label switching router (LSR), a label edge router (LER), an ingress router, an egress router, a provider router (e.g., a provider edge router, a provider core router, and/or the like), a virtual router, and/or the like. Additionally, or alternatively, embedded device 230 may include a gateway, a switch, a firewall, a hub, a bridge, a reverse proxy, a load balancer, and/or a similar device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
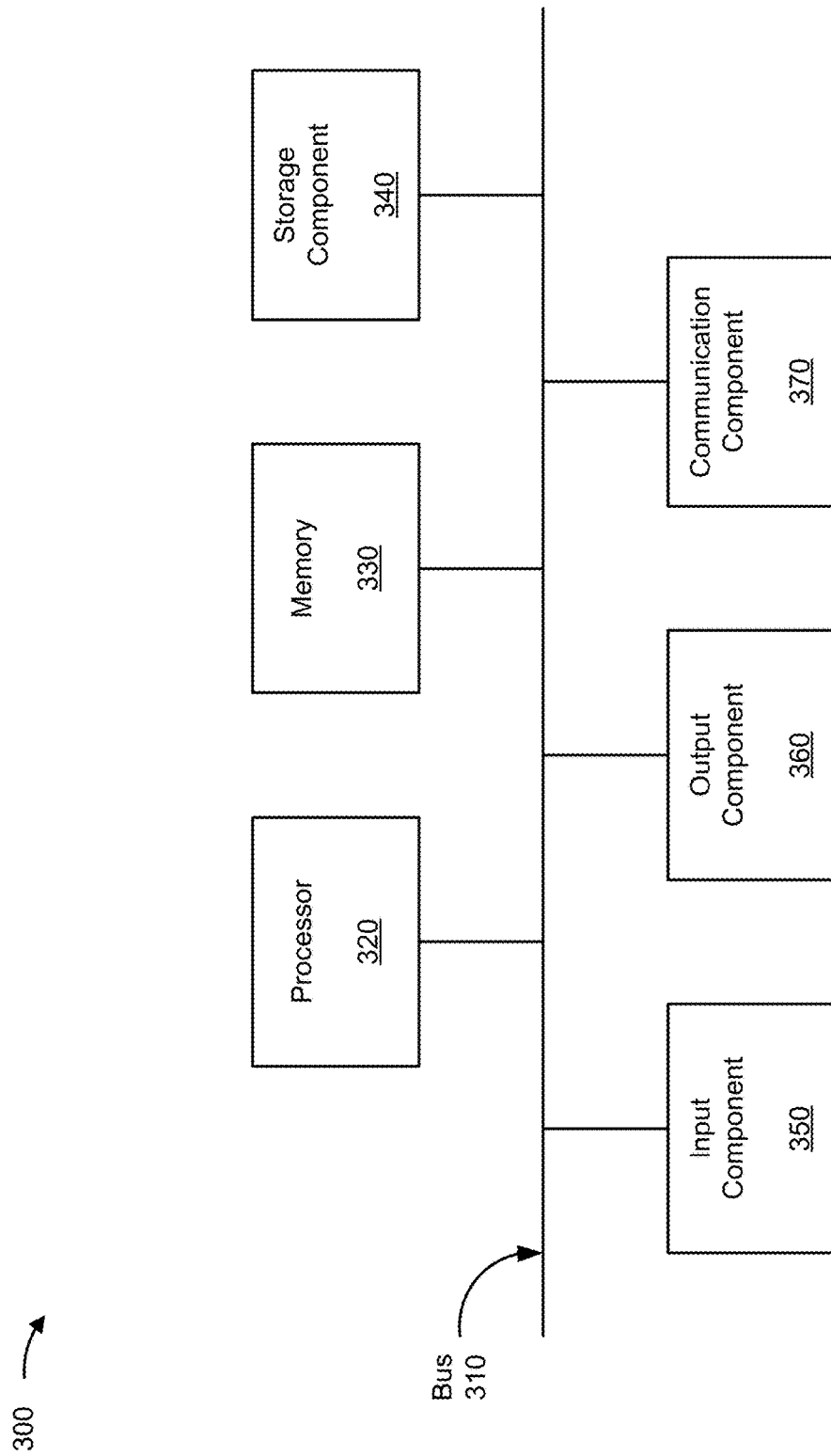
FIG. 3 is a diagram of example components of one or more devices of FIG. 2.

FIG. 3 is a diagram of example components of a device 300, which may correspond to lock manager 201 and/or embedded device 230. In some implementations, lock manager 201 and/or embedded device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with device access control for applications of multiple containers. In some implementations, one or more process blocks of FIG. 4 may be performed by a device (e.g., lock manager 201). In some implementations, one or more process blocks of FIG. 4 may be performed by another device or a group of devices separate from or including the device, such as an embedded device (e.g., embedded device 230) and/or the like. Additionally, or alternatively, one or more process blocks of FIG. 4 may be performed by one or more components of a device 300, such as processor 320, memory 330, storage component 340, input component 350, output component 360, communication component 370, and/or the like.

As shown in FIG. 4, process 400 may include receiving a lock request associated with using an embedded device of a containerized environment, wherein the lock request is associated with a first instance of a first application being executed in a first container of the containerized environment (block 410). For example, the device may receive a lock request associated with using an embedded device of a containerized environment, as described above. The embedded device may comprise at least one of a router, a switch fabric, a retimer, a sensor, and/or another type of device that includes a non-standard computing component.

In some implementations, the lock request is associated with a first instance of a first application being executed in a first container of the containerized environment. In some implementations, the lock request is received via an SDK that is associated with the embedded device and configured to permit the first instance of the first application to communicate with the embedded device during the device access operation. In some implementations, the SDK is a first instance of the SDK that is associated with the first instance of the first application that is in the first container. The device may receive the lock request from the first instance of the SDK based on the first instance of the first application in the first container causing the first instance of the SDK to provide the lock request to permit the application to perform the device access operation.

As further shown in FIG. 4, process 400 may include performing a lock operation associated with the embedded device (block 420). For example, the device may perform a lock operation associated with the embedded device to permit the first instance of the first application to use the embedded device, and prevent a second instance of a second application from using the embedded device, wherein the second instance of the second application is executing in a second container of the containerized environment, as described above. In some implementations, the second instance of the second application is executing in a second container of the containerized environment. The second instance of the second application may be associated with a second instance of the SDK.

In some implementations, the device may perform the lock operation to permit the first instance of the first application and/or the first instance of the SDK to use the embedded device in association with a device access operation. The device access operation may comprise at least one of a read operation associated with the embedded device, or a write operation associated with the embedded device.

In some implementations, prior to performing the lock operation, the device may verify that the embedded device is not locked according to another lock request received from a different instance of a third application operating in a different container from the first container and/or from a different instance of the SDK operating in a different container from the first container. The device may perform the lock operation on the embedded device based on verifying that the embedded device is not locked.

In some implementations, prior to performing the lock operation, the device may identify the embedded device based on the lock request indicating that the SDK is to perform the device access operation via a particular device type. The device may perform the lock operation based on identifying that the embedded device is of the particular device type and is unlocked. Alternatively, and/or additionally, prior to performing the lock operation, the device may identify the embedded device based on the lock request including information identifying at least one of a device type of the embedded device or a device identifier of the embedded device. The device may perform the lock operation on the embedded device based on identifying the embedded device.

In some implementations, the lock request identifies a device type of the embedded device, and performing the lock operation comprises permitting the first instance of the application to use the embedded device based on the device type being identified in the lock request, and preventing the second instance from using the embedded device based on the second instance being configured to use one or more embedded devices of the device type.

In some implementations, the lock request identifies a quantity of a set of embedded devices that are to be used in association with the device access operation and, prior to performing the lock operation, the device identifies a group of embedded devices, of the set of embedded devices, that are available to be used in association with the device access operation. The embedded device may be one of the group of embedded devices and the lock operation may be performed on the group of embedded devices based on identifying the group of embedded devices.

As further shown in FIG. 4, process 400 may include receiving a lock request from a second instance of a second application (block 430). For example, the device may receive a lock request from a second instance of a second application, as described above. In some implementations, the first application and the second application may be different applications. In some implementations, the first application and the second application may be the same application.

As further shown in FIG. 4, process 400 may include preventing the second instance of the second application from accessing the embedded device based on the embedded device being locked, wherein the second instance of the second application waits for the lock to become available to access the embedded device (block 440). For example, the device may prevent the second instance of the second application from accessing the embedded device based on the embedded device being locked, as described above. In some implementations, the second instance of the second application waits for the lock to become available to access the embedded device.

As further shown in FIG. 4, process 400 may include monitoring use of the embedded device during a device access operation of the first instance of the first application to detect an unlock event associated with unlocking the embedded device (block 450). For example, the device may monitor use of the embedded device during a device access operation of the first instance of the first application to detect an unlock event associated with unlocking the embedded device, as described above. The unlock event may comprise at least one of determining that the device access operation timed out, or receiving an unlock request from the first instance of the SDK.

In some implementations, monitoring the use of the embedded device comprises maintaining, based on receiving the lock request, a session identifier of the first instance of the application in a device management data structure. Alternatively, and/or additionally, monitoring the use of the embedded device comprises maintaining a session identifier of the first instance of the first application in a device management data structure and a timeout timer; denying, during a time period defined by the timeout timer, received lock management requests associated with the embedded device, and detecting the unlock event based on the time period expiring without the received lock management requests including an unlock request associated with the session identifier.

In some implementations, monitoring the use of the embedded device includes maintaining, based on receiving the lock request, a session identifier of the first instance of the SDK in a device management data structure; analyzing received lock management requests associated with a plurality of embedded devices of the containerized environment; and determining, in association with receiving an unlock request from the first instance of the SDK, that the unlock event occurred. The unlock request may include the session identifier of the first instance and a device identifier of the embedded device.

In some implementations, monitoring the use of the embedded device includes maintaining a session identifier of the first instance of the SDK in a device management data structure and a timeout timer; analyzing, during a time period defined by the timeout time, received lock management requests associated with a plurality of embedded devices of the containerized environment; and determining that the unlock event occurred in association with the time period expiring without receiving an unlock request that includes the session identifier.

As further shown in FIG. 4, process 400 may include performing an unlock operation based on detecting the unlock event to permit the second instance of the second application to use the embedded device (block 460). For example, the device may perform an unlock operation based on detecting the unlock event to permit the second instance of the second application to use the embedded device, as described above.

As further shown in FIG. 4, process 400 may include providing the lock associated with the embedded device to the second instance of the second application based on performing the unlock operation (block 470). For example, the device may provide the lock associated with the embedded device to the second instance of the second application based on performing the unlock operation, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
providing, by a device and during creation of a first container of a containerized environment, information that identifies a lock that is to be utilized for an embedded device of the containerized environment,
wherein the information that identifies the lock is provided to the first container, and
wherein the lock is configured to prevent concurrent access of the embedded device by multiple instances of a first application;
receiving, by the device and based on the information, a lock request associated with using the embedded device,
wherein the lock request is associated with a first instance of the first application being executed in the first container;
performing, by the device, a lock operation associated with the embedded device to:
permit the first instance of the first application to use the embedded device, and
prevent a second instance of the first application from using the embedded device during a time period in which the first instance of the first application is using the embedded device,
wherein the second instance of the first application is executing in a second container of the containerized environment;
monitoring, by the device, a use of the embedded device during a device access operation of the first instance of the first application;
detecting, by the device and based on monitoring the use of the embedded device during the device access operation of the first instance of the first application, an unlock event associated with unlocking the embedded device; and
performing, by the device, an unlock operation based on detecting the unlock event to unlock the embedded device, wherein unlocking the embedded device enables the second instance of the first application to use the embedded device.

2. The method of claim 1, wherein the lock request is received via a software development kit that is associated with the embedded device and configured to permit the first instance of the first application to communicate with the embedded device during the device access operation.

3. The method of claim 1, further comprising:
prior to performing the lock operation, verifying that the embedded device is not locked according to another lock request received from a different instance of the first application operating in a different container from the first container,
wherein the lock operation is performed based on verifying that the embedded device is not locked.

4. The method of claim 1, further comprising:
prior to performing the lock operation, identifying the embedded device based on the lock request including information identifying at least one of:
a device type of the embedded device, or
a device identifier of the embedded device,
wherein the lock operation is performed on the embedded device based on identifying the embedded device.

5. The method of claim 1, wherein the lock request identifies a device type of the embedded device, and performing the lock operation comprises:
permitting the first instance of the first application to use the embedded device based on the device type being identified in the lock request.

6. The method of claim 1, wherein monitoring the use of the embedded device comprises:
maintaining, based on receiving the lock request, a session identifier of the first instance of the first application in a device management data structure;
denying lock management requests associated with the embedded device until the unlock event is detected; and
detecting the unlock event based on receiving an unlock request from the first instance of the first application,
wherein the unlock request includes the session identifier of the first instance of the first application and a device identifier of the embedded device.

7. The method of claim 1, wherein monitoring the use of the embedded device comprises:
maintaining a session identifier of the first instance of the first application in a device management data structure and a timeout timer;
denying, during a time period defined by the timeout timer, received lock management requests associated with the embedded device; and
detecting the unlock event based on the time period expiring without the received lock management requests including an unlock request associated with the session identifier.

8. A device, comprising:
one or more memories; and
one or more processors to:
provide, during creation of a first container of a containerized environment, information that identifies a lock that is to be utilized for an embedded device of the containerized environment,
wherein the information that identifies the lock is provided to the first container, and
wherein the lock is configured to prevent concurrent access of the embedded device;
receive, from the first container and based on the information, a lock request associated with using the embedded device,
wherein the lock request is received from a first instance of a software development kit (SDK) being used by an application in the first container;
perform a lock operation associated with the embedded device to:
permit the first instance of the SDK to use the embedded device in association with a device access operation, and
deny a lock request, received during the device access operation, from a second instance of the SDK in a second container to prevent the second instance of the SDK from using the embedded device during the device access operation;
monitor a use of the embedded device by the first instance of the SDK during the device access operation;
detect an unlock event associated with unlocking the embedded device based on monitoring the use of the embedded device by the first instance of the SDK during the device access operation; and
perform an unlock operation based on detecting the unlock event to unlock the embedded device, wherein unlocking the embedded device permits the second instance of the SDK to use the embedded device.

9. The device of claim 8, wherein the first instance of the SDK is associated with a first instance of the application that is in the first container, and
   wherein the second instance of the SDK is associated with a second instance of the application that is in the second container.

10. The device of claim 8, wherein the one or more processors are further to:
   prior to performing the lock operation, identify the embedded device based on the lock request indicating that the SDK is to perform the device access operation via a particular device type,
      wherein the lock operation is performed based on identifying that the embedded device is of the particular device type and is unlocked.

11. The device of claim 8, wherein the unlock event comprises at least one of:
   determining that the device access operation timed out, or
   receiving an unlock request from the first instance of the SDK.

12. The device of claim 8, wherein the one or more processors, when monitoring the use of the embedded device, are configured to:
   maintain, based on receiving the lock request, a session identifier of the first instance of the SDK in a device management data structure;
   analyze received lock management requests associated with a plurality of embedded devices of the containerized environment; and
   determine, in association with receiving an unlock request from the first instance of the SDK, that the unlock event occurred,
      wherein the unlock request includes the session identifier of the first instance and a device identifier of the embedded device.

13. The device of claim 8, wherein the one or more processors, when monitoring the use of the embedded device, are configured to:
   maintain a session identifier of the first instance of the SDK in a device management data structure and a timeout timer;
   analyze, during a time period defined by the timeout timer, received lock management requests associated with a plurality of embedded devices of the containerized environment; and
   determine that the unlock event occurred in association with the time period expiring without receiving an unlock request that includes the session identifier.

14. The device of claim 8, wherein the embedded device comprises at least one of:
   a router,
   a switch fabric,
   a retimer, or
   a sensor.

15. A non-transitory computer-readable medium storing a set of instructions, the set of instructions comprising:
   one or more instructions that, when executed by one or more processors of a device, cause the device to:
      provide, during creation of a first container of a containerized environment, information that identifies a lock that is to be utilized for a set of embedded devices of the containerized environment,
         wherein the information that identifies the lock is provided to the first container, and
         wherein the lock is configured to prevent concurrent access of the set of embedded devices;
      receive, based on the information, a lock request associated with using the set of embedded devices,
         wherein the lock request is associated with a first instance of a software development kit (SDK) that is associated with a device type of the set of embedded devices and that is in the first container;
      identify an embedded device, of the set of embedded devices, for use in association with a device access operation,
         wherein the embedded device is identified based on the device type being identified in the lock request;
      perform a lock operation associated with the embedded device to:
         permit the first instance of the SDK to perform the device access operation on the embedded device, and
         prevent a second instance of the SDK from concurrently accessing the embedded device during the device access operation,
            wherein the second instance of the SDK is executing in a second container of the containerized environment;
      monitor a use of the embedded device by the first instance of the SDK during the device access operation;
      detect an unlock event associated with unlocking the embedded device based on monitoring the use of the embedded device by the first instance of the SDK during the device access operation; and
      perform, based on detecting the unlock event, an unlock operation to unlock the embedded device,
         wherein unlocking the embedded device permits the second instance of the SDK to use the embedded device.

16. The non-transitory computer-readable medium of claim 15, wherein the lock request is received from the first instance of the SDK based on an instance of an application in the first container causing the first instance of the SDK to provide the lock request to permit the application to perform the device access operation.

17. The non-transitory computer-readable medium of claim 15, wherein the one or more instructions further cause the device to:
   prior to performing the lock operation, verify that the embedded device is not locked according to another lock request received from a different instance of the SDK operating in a different container from the first container,
      wherein the lock operation is performed based on verifying that the embedded device is not locked.

18. The non-transitory computer-readable medium of claim 15, wherein the lock request identifies a quantity of the set of embedded devices that are to be used in association with the device access operation, wherein the one or more instructions further cause the device to:
   prior to performing the lock operation, identify a group of embedded devices, of the set of embedded devices, that are available to be used in association with the device access operation,
      wherein the lock operation is performed on the group of embedded devices based on identifying the group of embedded devices,
         wherein the embedded device is one of the group of embedded devices.

19. The non-transitory computer-readable medium of claim 15, wherein the one or more instructions that cause the one or more processors to detect the unlock event, cause the one or more processors to:
 receive an unlock request from the first instance of the SDK,
  wherein receiving the unlock request corresponds to the unlock event.

20. The non-transitory computer-readable medium of claim 15, wherein the device access operation comprises at least one of:
 a read operation associated with the embedded device, or
 a write operation associated with the embedded device.

\* \* \* \* \*